Oct. 5, 1965         H. B. RICH ETAL         3,209,799
                  MACHINE FOR FORMING LADDERS
Filed Feb. 20, 1963                          4 Sheets-Sheet 1

INVENTOR.
HOWARD B. RICH
ANDREW T. GREEN
BY Pearce & Schaeperklaus

Attorneys

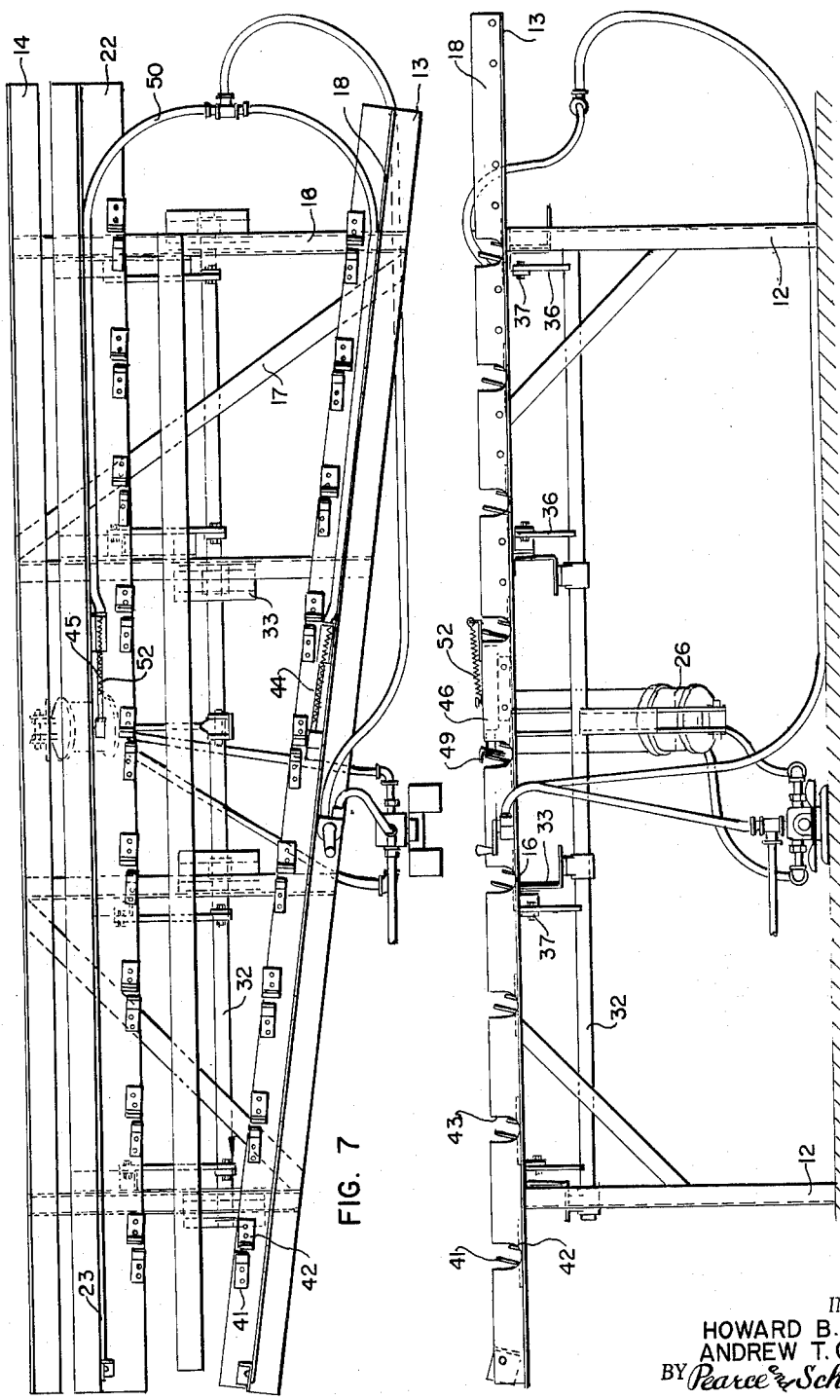

Oct. 5, 1965    H. B. RICH ETAL    3,209,799
MACHINE FOR FORMING LADDERS
Filed Feb. 20, 1963    4 Sheets-Sheet 3

INVENTOR.
HOWARD B. RICH
ANDREW T. GREEN
BY Pearce & Schaeperklaus

Attorneys

United States Patent Office 3,209,799
Patented Oct. 5, 1965

3,209,799
MACHINE FOR FORMING LADDERS
Howard B. Rich, Carrollton, and Andrew T. Green, Worthville, Ky., assignors to Howard B. Rich, Inc., Carrollton, Ky., a corporation of Kentucky
Filed Feb. 20, 1963, Ser. No. 260,009
5 Claims. (Cl. 144—2)

This invention relates to a machine for forming ladders. More particularly, this invention relates to a machine for forming a main or step portion of a ladder having reinforced steps of the type shown and claimed in the copending application of Howard B. Rich, Serial No. 231,184, filed October 17, 1962, now Patent No. 3,136,387.

An object of this invention is to provide a machine for forming ladders which receives and holds a set of rungs or step members in association with rails and cross-tensioning rods, advances the rails into position with gains thereof opposite ends of the rungs, forces the rails toward each other to receive end portions of the rungs in the gains, and holds the assembly of rails, rungs and tension rods while the tension rods are tightened to hold the rails and rungs in assembled relation.

A further object of this invention is to provide such a machine which includes a first frame which is provided with supports for one of the side rails and end portions of rungs adjacent that one of the side rails, a second frame which is movable toward and away from the first frame and is provided with supports for the other of the rails and the other end portions of the rungs, means on the frames for urging the rails along the frames into engagement with stop members which limit movement of the rails when the gains therein are opposite the rungs and means for bringing the frames toward each other to drive the rails onto end portions of the rungs.

The above and other objects and features of the invention will be apparent to those skilled in the art to which this invention pertains in the following detailed description and the drawings, in which:

FIG. 6 is a view in side elevation of a machine constructed in accordance with an embodiment of this invention, the machine being adapted for forming the main portion of the stepladder illustrated in FIG. 1;

FIG. 7 is a plan view of the machine illustrated in FIG. 6;

In the following detailed description and the drawings, like reference characters indicate like parts.

Figure 9:
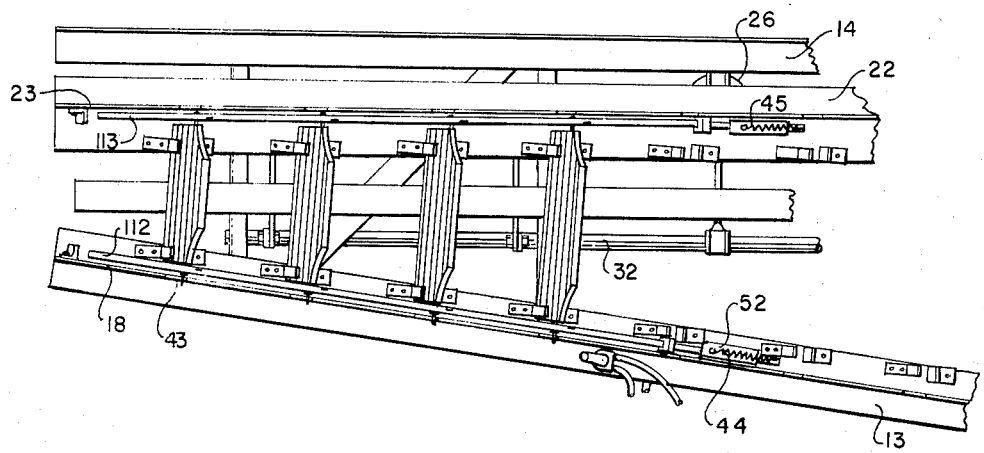
FIG. 9 is a fragmentary plan view showing a portion of the machine in association with side rails, rungs and tension members mounted thereon in a first position.
Figure 8:
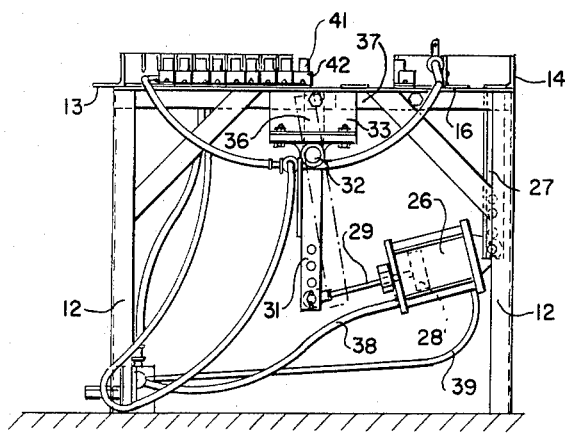
FIG. 8 is a view in end elevation of the machine illustrated in FIG. 6.
Figure 11:
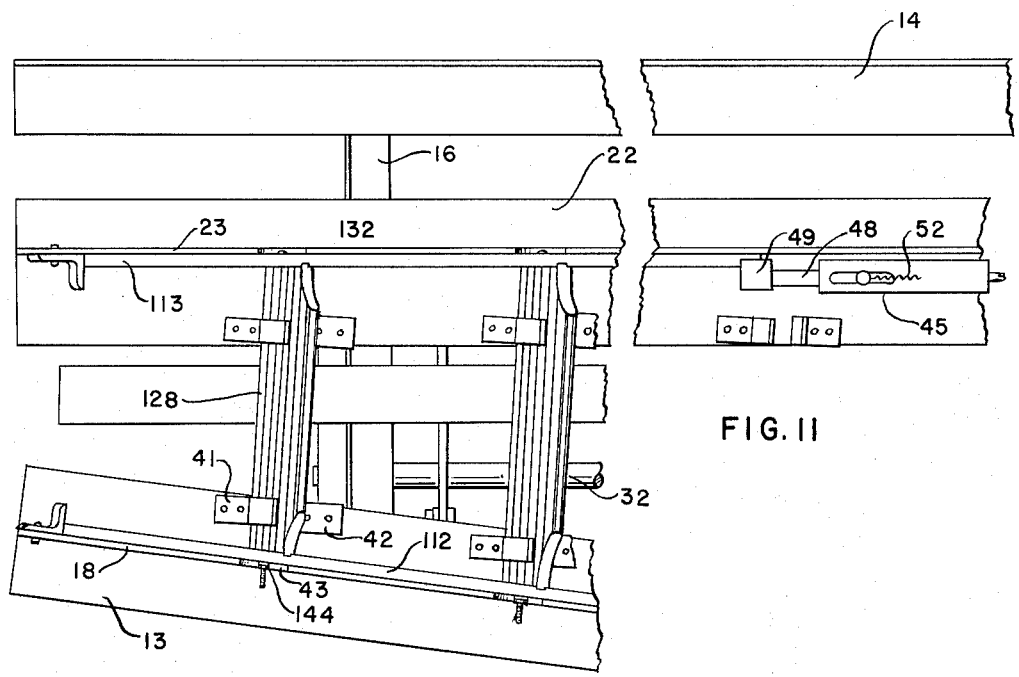
FIG. 11 is an enlarged fragmentary view showing a portion of the machine in a third position.

In FIGS. 6, 7 and 8 is illustrated a ladder forming machine constructed in accordance with an embodiment of this invention. The machine includes upright legs 12 (FIGS. 6 and 8) on which a stationary lengthwise rail supporting frame 13 is mounted. In addition, a lengthwise frame 14 is supported on the legs 12. The frames 13 and 14 are linked by cross frames 16 and 17 (FIGS. 7 and 8). An upright flange 18 on the stationary rail supporting frame 13 is engageable with a rail 112 when the rail 112 is mounted on the frame 13. A second rail supporting frame 22 is mounted on the cross-members 16 and 17 for sliding transversely between the position shown in FIG. 7 and that shown in FIG. 11. The rail supporting frame 22 includes an upright flange 23 engageable with a rail 113, which rail is mounted on the rail supporting frame 22, as shown in FIG. 9. The frame 22 is moved back and forth by a mechanism which comprises a cylinder 26, pivotally mounted on an upright arm 27, which is suspended from the stationary frame 14. A piston 28 which moves in the cylinder 26 carries a piston rod 29 which is linked to a lower end of a crank arm 31. The crank arm 31 is mounted on a shaft 32 which extends lengthwise of the machine. The shaft 32 is rotatably mounted in bearings supported on plates 33 which hang downwardly from the cross frames 16. A series of cranks 36, mounted on the shaft 32, are pivotally connected to links 37 which, in turn, are pivotally connected to the movable rail supporting frame 22. When fluid under pressure is directed through a line 38 into one end of the cylinder 26, the cranks 31 and 36 are swung to the dot-dash line position of FIG. 8 to move the movable rail supporting frame 22 to the position of FIG. 11. When fluid under pressure is directed through a line 39 into the other end of the cylinder 26, the cranks are moved to the full line position of FIG. 8.

On each of the rail supporting frames 13 and 22 are mounted a plurality of sets of rung holding brackets 41 and 42 which, as shown in FIG. 9, can hold a plurality of rungs or steps 128 with the rungs being slideable a limited distance transversely of the machine. As shown in FIG. 6, openings 43 are provided in the flanges 18 and 23 opposite the rung holding brackets 41 and 42.

Figure 10:
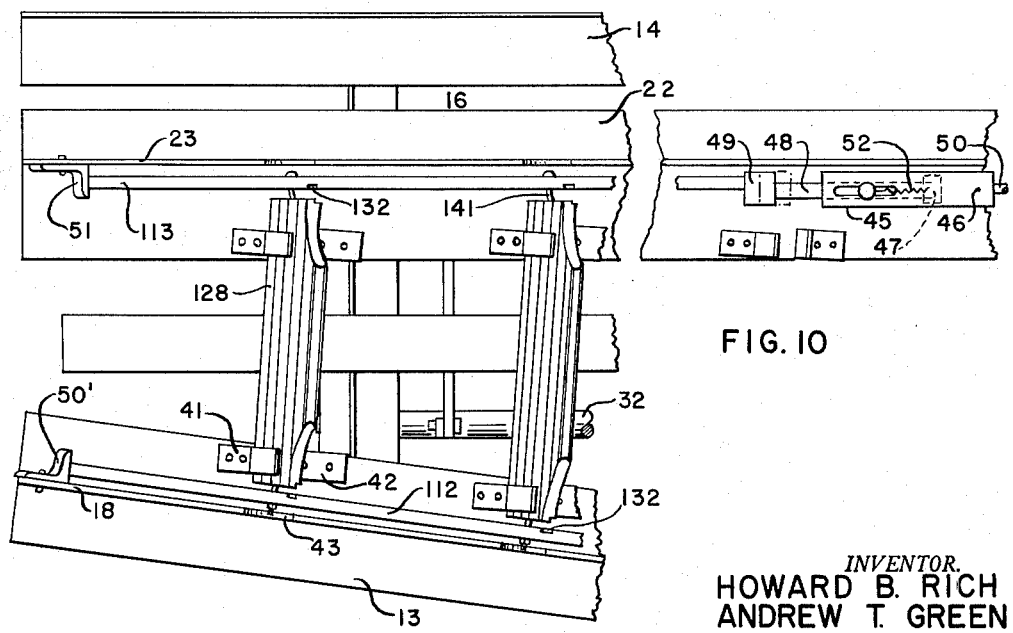
FIG. 10 is an enlarged fragmentary plan view showing the machine together with the side rails, rungs and tension members in a second position.

Rail advancing units 44 and 45 (FIG. 7) are mounted on the rail supporting frames 13 and 22, respectively. Each of the rail advancing units includes a cylinder 46 (FIG. 10) inside which a piston 47 moves. A piston rod 48, attached to the piston 47, carries a head 49. As shown in FIG. 6, the head 49 is of angle shape. Fluid under pressure can be injected into the cylinder 46 through a line 50 (FIG. 10) to move the piston 47 and the head 49 from the right to the left, as shown in FIG. 10 (from the dot-dash line position to the full line position of the head). The heads are engageable with ends of the rails to urge the rails from the FIG. 9 position to the FIG. 10 position in which the left-hand ends of the rails engage stop members 50′ and 51 mounted on the rail supporting frames 13 and 22, respectively. When the pressure inside the cylinder 46 is released, a spring 52 returns the heads to the FIG. 9 position.

Figure 1:
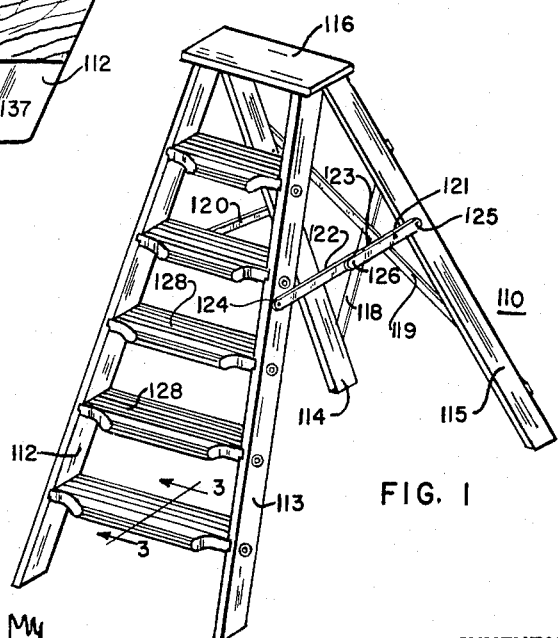
FIG. 1 is a perspective view of a stepladder having a main portion of the type formed in a machine constructed in accordance with an embodiment of this invention.

The machine can be used for forming a main portion of a stepladder 110 or the like of the type shown in FIGS. 1 to 5, inclusive. As shown in FIG. 1, the ladder includes side rails 112 and 113 hinge connected at their upper ends to brace or stay legs 114 and 115. The upper end of the ladder can be provided with the usual platform 116. The stay legs 114 and 115 can be provided with cross braces 118 and 119. The rails 112 and 113 can be connected to the stay legs 114 and 115 by means of braces 120 and 121 of the usual construction. As shown, each of the braces 120 and 121 comprises links 122 and 123 pin connected as at 124 and 125 to the side rails and the stay legs. Adjacent ends of the links are pin connected as at 126 to form a hinge.

Figure 2:
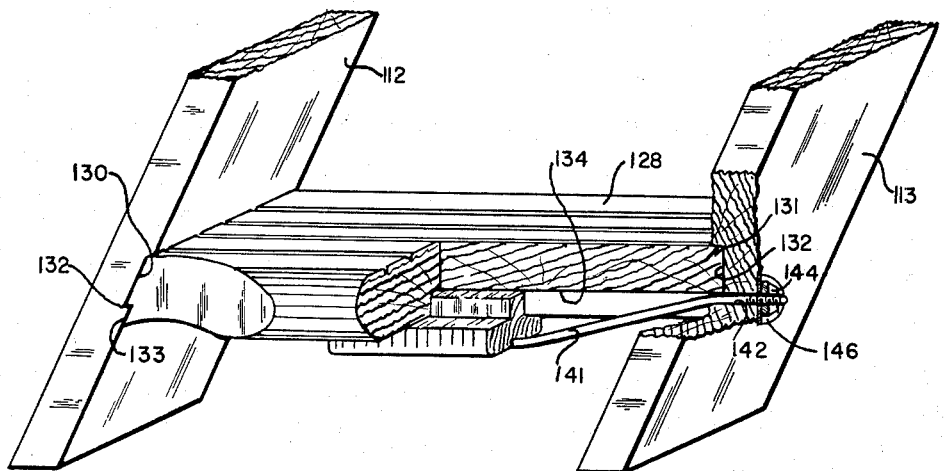
FIG. 2 is an enlarged fragmentary perspective view partly broken away and in section showing portions of side rails together with one step of the stepladder.
Figure 3:
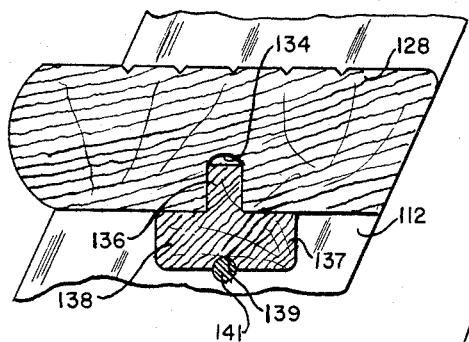
FIG. 3 is a view in section taken on the line 3—3 in FIG. 1.

The ladder is provided with steps or rungs 128, the construction of each of which is shown more particularly in FIGS. 2 to 5, inclusive. Each step 128 is formed of a wooden block provided with outwardly extending projections or tongues 130 and 131 (FIG. 2). The tongues 130 and 131 extend into gains 132 in the side rails. The step or rung extends downwardly from the tongues 130 and 131 forming shoulders 133 which face and engage the side rails. A lengthwise groove 134 (FIG. 3) is formed on the underside of the step or rung. The groove 134 receives a tongue 136 of a T-shaped wedge block 137. The tongue 136 fits snugly in the groove 134 with a cross-bar portion 138 underlying and resting against a bottom face of the step. A shallow groove 139 along the center of the cross-bar portion 138 of the wedge block 137 receives a central portion of a tension rod 141.

Figure 5:
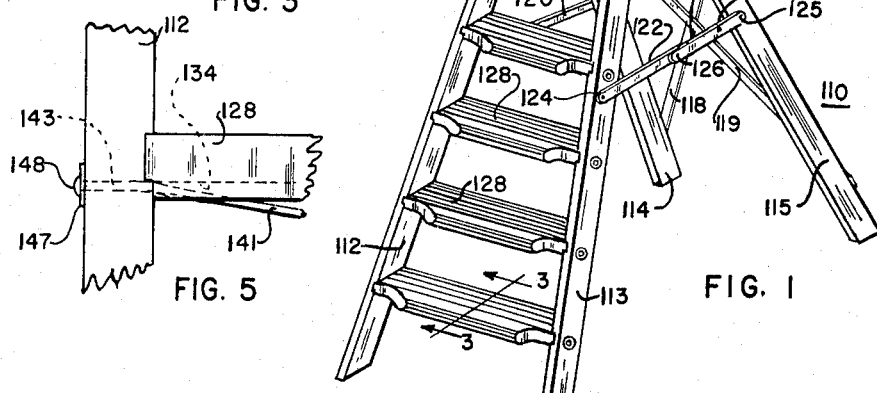
FIG. 5 is an enlarged fragmentary view of an end portion of one of the steps in association with a fragmentary portion of one rail of the ladder.
Figure 4:
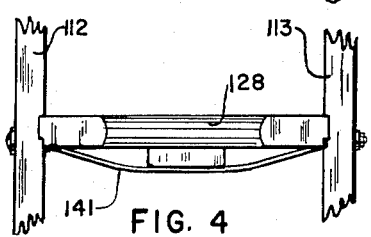
FIG. 4 is a fragmentary view in front elevation showing one step in association with fragmentary portions of side rails of the stepladder.

The tension rod extends through bores 142 (FIG. 2) and 143 (FIG. 5) in the side rails 113 and 112, respectively, and into end portions of the groove 134 adjacent the side rails as shown most clearly in FIGS. 2 and 5. A nut 144 threaded on the tension rod 141 engages a washer 146 and grips the washer 146 against an outer face at the side rail 113. A similar washer 147 is engaged by a head portion 148 of the tension rod, as shown in FIG. 5. The bores 142 and 143 are aligned with the groove 134 of the step so that portions of the tension rod adjacent the side rails are received in the groove 134 to lock the step into position between the side rails with the tension rod forming a trussed structure with the block 137 to strengthen and support the step centrally thereof.

In the forming of the main portion of the ladder, a set of rungs 128 is mounted on the frames 13 and 22 as shown in FIG. 9, with one of the T-shaped wedge blocks 137 being placed in the groove of each rung. An assembly of rails 112 and 113 together with tension rods 141, washers and nuts 144 are set in place as shown in FIG. 9. Then fluid under pressure is introduced into the cylinders 46 to cause the rails to be moved from the FIG. 9 position to the FIG. 10 position, at which the gains 132 in the rails are aligned with the rungs. Then fluid under pressure is introduced into the cylinder 26 through the line 38 (FIG. 8) to cause swinging of the cranks 26 and 31 to the dot-dash position in FIG. 8 to move the movable rail supporting frame 22 from the FIG. 10 position to the FIG. 11 position at which end portions of the rungs or steps 128 are received in the gains 132 of the rails. Then the nuts 144 can be tightened on the tension rods 141 to hold the rails and rungs in firmly assembled relation. Any excess length of the tension rods can be removed, and the main section of the ladder can then be assembled with other sections to form the completed stepladder of FIG. 1.

The machine for forming ladders described above and illustrated in the drawings is subject to structural modifications without departing from the spirit and scope of the appended claims.

Having described our invention, what we claim as new and desire to secure by Letters Patent is:

1. A machine for forming a ladder which comprises a pair of elongated frames, means on each of the frames for supporting in a first position a side rail having gains therein, means on the frames for supporting a plurality of steps extending between and transversely of the rails, means mounted on each of the frames for engaging the rail mounted thereon and advancing the rail transversely of said steps and longitudinally of the rail into a second position with gains in said rail in alignment with the steps, and means for advancing at least one of the frames toward the other frame to drive the rails onto end portions of the steps with the end portions of the steps being received in the gains.

2. A machine for forming a ladder which comprises a pair of elongated frames, means on each of the frames for supporting in a first position a side rail having gains therein, means for supporting a plurality of steps extending between and transversely of the rails on the frames and with the steps being slideable transversely of the frames, means mounted on each of the frames for engaging the rail mounted thereon and advancing the rail lengthwise thereof from said first position to a second position, a stop member mounted on each frame and engageable by the rail mounted thereon when in said second position with gains in the rail in alignment with the steps, and means for advancing at least one of the frames toward the other frame and transversely of the rails to drive the rails onto end portions of the steps with the end portions of the steps being received in the gains.

3. A machine for forming a ladder which comprises a main framework, a stationary elongated frame mounted on the framework, a movable frame mounted on the framework for movement toward and away from the stationary frame, means on each of the frames for supporting a side rail having gains therein and with tension rods linking the rails in a first position, means for supporting on the main framework a plurality of steps extending between and transversely of the stationary and movable frames with the steps being slideable transversely of the frames and having truss-wedge blocks extending toward said tension rods, means mounted on each of the frames for engaging the rail mounted thereon and advancing the rail lengthwise thereof from said first position to a second position, a stop member mounted on each frame and engageable by the rail mounted thereon when in said second position with gains in the rail in alignment with the steps, the tension rods being drawn into engagement with wedge blocks underlying the steps when the rails are moved lengthwise of the frames into said second position, and means for advancing the movable frame toward the stationary frame and transversely of the rails to drive the rails onto end portions of the steps with the end portions of the steps being received in the gains.

4. A machine for forming a ladder which comprises a pair of elongated frames, means on each of the frames for supporting in a first position a side rail having gains therein and with tension rods linking the rails, means on the frames for supporting a plurality of steps extending between and transversely of the rails and having wedge blocks extending toward said tension rods, means mounted on each of the frames for engaging the rail mounted thereon and advancing the rail lengthwise on the frame into a second position with gains in the rail in alignment with the steps, the tension rods being drawn into engagement with wedge blocks underlying the steps when the rails are moved lengthwise of the frames to said second position and means for advancing at least one of the frames toward the other frame to drive the rails onto end portions of the steps with the end portions of the steps being received in the gains.

5. A machine for forming a ladder which comprises a pair of elongated frames, means on each of the frames for supporting in a first position a side rail having gains therein and with tension rods linking the rails, means on the frames for supporting a plurality of steps extending between and transversely of the rails and having wedge blocks extending toward said tension rods, means mounted on each of the frames for engaging the rail mounted thereon and advancing the rail lengthwise on the frame into a second position with gains in the rail in alignment with the steps, the tension rods being drawn into engagement with wedge blocks underlying the steps when the rails are moved lengthwise of the frames to said second position, said elongated frames being cut away to expose the ends of said tension rods and adjacent portions of said side rails when said side rails are in said second position, and means for advancing at least one of the frames toward the other frame to drive the rails onto end portions of the steps with the end portions of the steps being received in the gains and holding said rails and steps in such relation while said tension rods are placed in tension as desired.

References Cited by the Examiner
UNITED STATES PATENTS

| | | |
|---|---|---|
| 1,209,705 | 12/16 | Hayward. |
| 1,645,414 | 10/27 | Kalgren. |
| 1,695,461 | 12/28 | Kalgren. |
| 1,842,850 | 1/32 | Uline. |
| 2,996,721 | 8/61 | Black _____ 269—37 |

LESTER M. SWINGLE, *Primary Examiner.*

WILLIAM W. DYER, JR., *Examiner.*